(12) United States Patent
Fagan

(10) Patent No.: US 10,871,758 B2
(45) Date of Patent: Dec. 22, 2020

(54) PLASMA PROCESSING LONG STEEL PRODUCT INCLUDING BEAMS

(71) Applicant: Matthew Fagan, Middle Park (AU)

(72) Inventor: Matthew Fagan, Middle Park (AU)

( * ) Notice: Subject to any disclaimer, the term of this patent is extended or adjusted under 35 U.S.C. 154(b) by 522 days.

(21) Appl. No.: 14/182,056

(22) Filed: Feb. 17, 2014

(65) Prior Publication Data

US 2014/0236339 A1 Aug. 21, 2014

Related U.S. Application Data

(60) Provisional application No. 61/765,553, filed on Feb. 15, 2013.

(51) Int. Cl.
| | |
|---|---|
| *G05B 19/18* | (2006.01) |
| *B23K 10/00* | (2006.01) |
| *B23K 37/02* | (2006.01) |
| *B23K 101/28* | (2006.01) |
| *B23K 103/10* | (2006.01) |
| *B23K 103/04* | (2006.01) |

(52) U.S. Cl.
CPC ............ *G05B 19/182* (2013.01); *B23K 10/00* (2013.01); *B23K 37/0235* (2013.01); *B23K 2101/28* (2018.08); *B23K 2103/04* (2018.08); *B23K 2103/10* (2018.08); *G05B 2219/36199* (2013.01); *G05B 2219/40293* (2013.01); *G05B 2219/45041* (2013.01)

(58) Field of Classification Search
CPC .... G05B 19/182; B23K 10/00; B23K 10/006; B23K 37/0235; B23K 37/0241; B23K 37/0288; B23K 2201/28; B23K 26/38
USPC ............ 219/121.39, 121.44, 121.41, 121.42, 219/121.59; 700/160; 266/54
See application file for complete search history.

(56) References Cited

U.S. PATENT DOCUMENTS

| | | | | |
|---|---|---|---|---|
| 4,466,069 A | * | 8/1984 | Balfanz ................. | B23K 7/002 266/58 |
| 6,772,040 B1 | * | 8/2004 | Picard ..................... | H05H 1/36 219/121.11 |
| 8,683,841 B1 | * | 4/2014 | Walsh ................... | B21C 37/122 219/121.36 |

(Continued)

FOREIGN PATENT DOCUMENTS

| | | |
|---|---|---|
| CN | 2691773 | 4/2005 |
| WO | 2012127319 A1 | 9/2012 |

OTHER PUBLICATIONS

Ocean Machinery. (Dec. 11, 2008). Beam Cut to Length with CNC Beam Coping Machine [Video file]. Retrieved from https://www.youtube.com/watch?v=kGYlAuiUgso.*

(Continued)

*Primary Examiner* — Tu B Hoang
*Assistant Examiner* — Alba T Rosario-Aponte
(74) *Attorney, Agent, or Firm* — Lathrop GPM LLP

(57) ABSTRACT

A method of processing long product on a numerical control machine including a gantry, a cutting bed, and a gantry holding a cutting torch, includes the steps of moving the gantry over a stationary long product on the cutting bed while cutting the long product with the cutting torch to process the long product. The cutting torch is capable of moving in at least the X-, Y-, and Z-directions relative to an arbitrary coordinate system defining the dimensions of the long product.

17 Claims, 10 Drawing Sheets

(56) References Cited

U.S. PATENT DOCUMENTS

| | | | | |
|---|---|---|---|---|
| 2008/0185368 A1* | 8/2008 | Fagan | ................... | B23K 7/001 |
| | | | | 219/124.21 |
| 2009/0071944 A1 | 3/2009 | Forlong | | |
| 2009/0250445 A1 | 10/2009 | Yamaguchi | | |
| 2009/0312862 A1* | 12/2009 | Fagan | ................. | B23K 10/006 |
| | | | | 700/160 |
| 2010/0155377 A1* | 6/2010 | Lindsay | ................ | B23K 31/10 |
| | | | | 219/121.44 |
| 2010/0301020 A1 | 12/2010 | Phillip et al. | | |
| 2010/0314361 A1* | 12/2010 | Buccella | ............... | B23K 10/00 |
| | | | | 219/121.39 |
| 2011/0316977 A1* | 12/2011 | Pienaar | ............. | G05B 19/4068 |
| | | | | 348/46 |
| 2012/0242015 A1* | 9/2012 | Fagan | ............... | B23K 37/0288 |
| | | | | 266/59 |

OTHER PUBLICATIONS

PCT application PCT/IB2014/000753 International Search Report and Written Opinion dated Sep. 26, 2014, 17 pages.
Extended European Search Report corresponding to European Patent Application No. 14752133.0; dated Dec. 9, 2016; 8 pages.
Fagan et al., Plasma Beveling Technology Offers Precise Plate Weld Preparation, Welding Journal, Feb. 2011, 4 pages.
First Office Action dated Nov. 28, 2016 for Chinese Patent Application No. 201480020672.7 (including partial English translation).
Second Office Action dated Jul. 13, 2017 for Chinese Patent Application No. 201480020672.7 (including partial English translation).

* cited by examiner

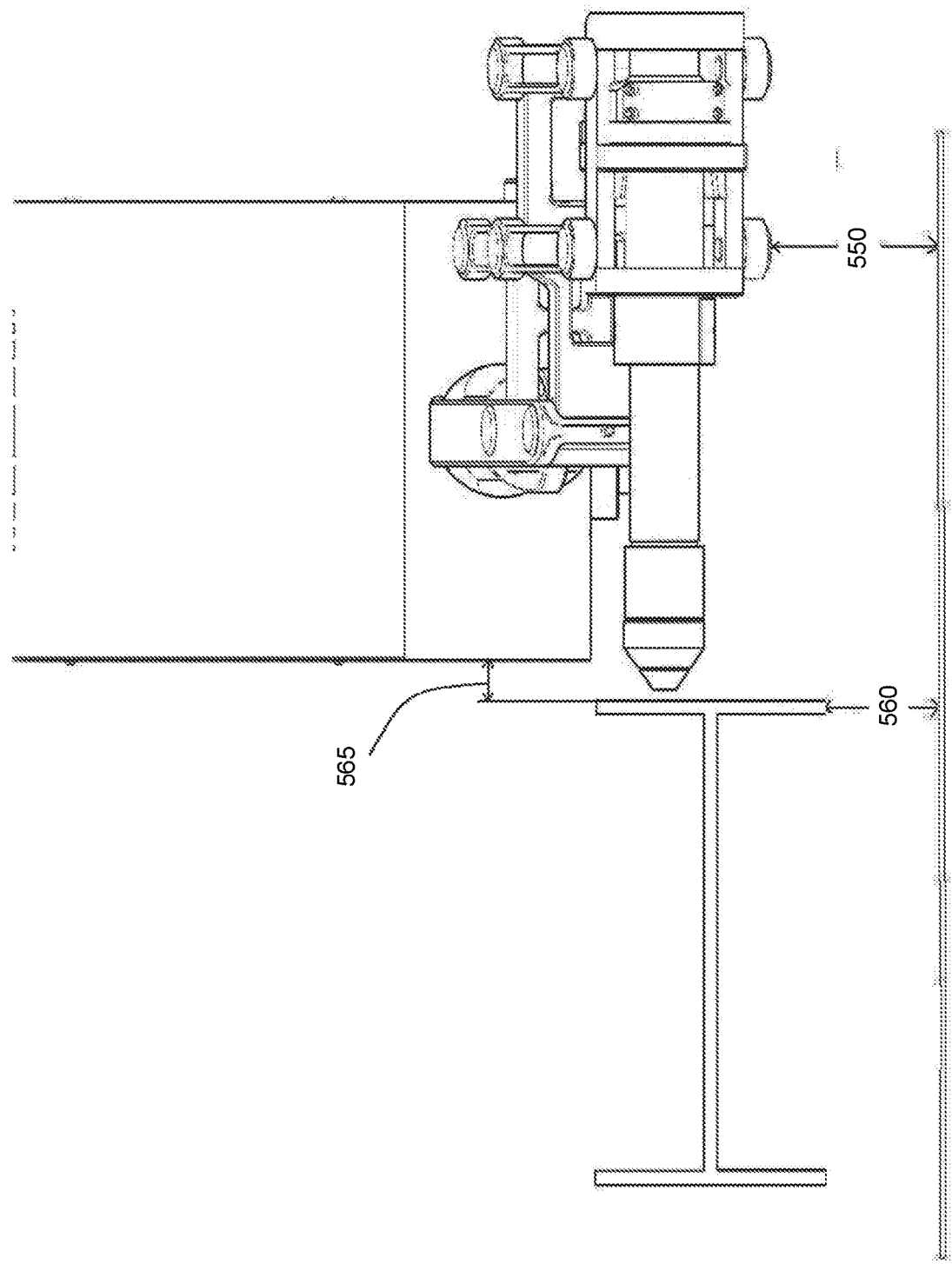

PLASMA PROCESSING LONG STEEL PRODUCT INCLUDING BEAMS

RELATED APPLICATION

This application claims priority to U.S. Patent Application Ser. No. 61/765,553, filed Feb. 15, 2013, the disclosure of which is incorporated herein by reference.

FIELD OF THE INVENTION

The present application relates to the field of plate cutting, and more particularly to the field of processing long steel products for steel construction.

BACKGROUND OF THE INVENTION

Examples of long products are sectionally shown in FIG. 2, and include a variety of shapes from traditional I beams (210), to Channel (215), Equal Angle (220), Unequal angle (230), Rolled Hollow Section (RHS, 240), flat bar (250), T section (270) beam, and more. Each type of long product may also include many variations thereof. Processing of long products typically involves sawing and drilling. Tube 260 and Rolled Hollow Section 240 may be processed with plasma machines. For ease of illustration, the following description will describe the present systems and methods mostly with respect to processing of beams, but one of ordinary skill in the art, after reading and comprehending the present application, will appreciate how the present systems and methods will also be applicable to other long products.

In beam processing, a circular saw or band saw may be used to cut the beams either before or after drilling. A large drill may also be used to put in bolt holes that may be later required for assembly of a structure. Conventionally, it is inexpensive to drill holes in a processed beam, thus many conventional systems utilize manual positioning for the drills. In this conventional process, a skilled layout tradesperson, working from printed drawings, would first mark all the bolt hole positions over perhaps an hour of the tradesperson's time. The holes would then be drilled and cut. A variety of special purpose drills and saws may be used for the drilling and cutting. Variations for special purpose drills include, but are not limited to a "beam line" drill, an "angle line," a "plate line" with drilling head, a "flat bar burner." Add-on processes for such machines may include an oxy torch "coper" to shape the ends, a marking machine to indicate points along the beam, and a "hard stamper" to punch lettering deep into the steel to identify the beam. Conventional saws may vary in size, cost, and power. Some saws only cut squarely, but others can cut at an angle which is called a "mitre," which has the same meaning for wood, plaster, or other materials cut at an angle. Often such saws can only mitre in one direction from a square cut, so careful positioning of the beam is required. As discussed below, the present systems and methods are capable of advantageously realizing a dramatic increase in productivity by eliminating the time and resources required to mark the beams and long products, the excess handling time required to switch between drill and saw, as well as the considerable costs experienced to correct for human error. A single hole in the wrong position, or a mitre upside down, can turn a very expensive beam into scrap.

The largest and most expensive conventional automatic machines for cutting and drilling beams are beamlines. Such machines typically move beams around a factory on elevated roller conveyors and then feed the beams into a drill, and then into a saw, as in a production line. Such factories cover a lot of area and are conventionally utilized only for very high volumes of repetition cutting for large steel structures.

The number of cross sections possible for long product, such as those shown in FIG. 2, has resulted in the existence of a range of different, and often incompatible, specialized automatic machines from a relatively limited number of international manufacturers including Peddinghaus, Wagner, Fichep, Daito, and others. Less expensive machines are often capable of processing only one section type, such as angle line 220, 230, or flat bar burner for section 250. Size of a beam may also influence the cost of the machine required to process the beam, so the machines may also come in different sizes, and at different prices and capacity.

The $20^{th}$ century saw little change in the present field of technology except for the advent of Numerical Control (NC) in the early 1970s. Typically though, there is no generally accepted or standard NC programming language, and every machine was different to the next, even from the one manufacturer. Individual beamlines, for example, were known to have up to 12 separate programmable axes, and the physical layout of drills, stops, clamps, probes changed endlessly, making NC programming particularly onerous.

At the same time, demand for more functionality has grown, and more processing functions have been added to machines that essentially began as powerful multi axis drills. Plasma or oxy torches have been added to the drills for coping, penetrating, beam splitting, and other applications. Each added functionality, however, added its own practical problems, and each functionality has been conventionally implemented in a different way from machine to machine, adding to the programming complexity that was already exceedingly difficult, and beyond the capability of a person of only ordinary skill in the art.

While most automatic machines (other than band saws and cold saws) were primarily very large drilling stations, many of such machines further involved complex systems to integrate product handling, including hydraulics, stops, probes, and sets of drills in three major directions, from the left, right, and above. These additional complex systems in turn added more complex sequencing problems in the machine programming. While the ultimate productivity of these specialist machines, typically for large volumes in highly repetitious, multi-story buildings, was enough to justify the very high price of the machines, many companies and countries still cannot afford the expense and resources required to operate such machines. The number of such machines in production around the world is very low, with perhaps only a few of the largest machines located in cities having populations of over 1 million people.

Additionally, due to the wide variation in function and layout, each large machine would require unique programming software to match its functionality. Such software, however, has conventionally experienced only a short lifespan. While the machines themselves are known to have a practical service lifespan measured in decades, due to their extremely heavy construction, software to operate such machines is known to quickly become unsupported, especially in a rapidly changing world of computers. This software problem has not improved as of the present time, and the field is not showing improvements in widespread automation of beam processing in the structural world.

In addition to the manual drilling and beamlines discussed above, punch machines are also known for rare use in some beam processing. Punch machines may be used to create bolt holes, but the area of the beam that is distorted by the punch requires additional manual resources to ream and address the distortion.

One recent change in the field was the creation of a standard description language to describe long product, and is also known as DSTV ("STANDARD DESCRIPTION FOR STEEL STRUCTURE PIECES FOR NUMERICAL CONTROLS"), and was the result of the German DSTV commission in 1998. A further standard was released in 2007 which changed the computer format to a newer XML format, and has resulted in at least one reference language to describe long product. This language also included simple chamfers for weld preparation where required, and was useful to describe most long product. The creation of this standard description, however, did not in itself solve programming problems for basic applications, since these new DSTV files were only created by large expensive CAD systems used to design whole buildings.

Until 2005, flame cutters were not used to cut bolt holes because of concerns about the heat affected zone around the burned hole. Flame cutters affect the metallurgy of the beam being cut, and the flame cutters were also known to be very slow to pierce the material in comparison with modern plasma cutting, that is, a difference of minutes compared with seconds. Thus, drilling was still mandatory. Drills use great force with great weight, and therefore rigid, large, heavy, and expensive machines have been required to operate such drills. The beams themselves could also be very heavy, often weighing tons. To justify this cost, greatly increased productivity had to be achieved and to so, automated conveyor systems and large factories were required. Few have been able to afford such automation. The number of such machines worldwide is very low, and the support software essential for programming has rapidly become obsolete and unsupported. In a few conventional applications, persons of special skill in the field have been known to directly enter beam data manually into the automated drilling machines. Persons of ordinary skill in the art though, are not capable of such manual entry from machine to machine.

In 2005, the American Institute of Steel Construction AISC Specification Section M2.5 announced that plasma and flame cutting were approved for making bolt holes, in addition to plasma cut holes, which was a direct consequence of advances in plasma technology. For example, the plasma hole slant had dropped to under 4 degrees of slant, and the improved smoothness was substantially better than the minimum required by the standard. Also, the time to create an acceptable hole was measured in seconds instead of minutes as with traditional drills. With computer control, holes of almost any size and shape could be made quickly, including a round bolt hole. Even as such plasma/flame cutting have begun to replace manual drilling though, some structures having critical hole sizes and shapes still require traditional drilled holes. Such structures include, but are not limited to, structures which flex continually like towers and bridges.

At least one company has proceeded to produce machines to use plasma to cut bolt holes. These machines look and work much like the traditional beamline concept, where beams are fed in a line or rollers through a work cell and processed fully with a plasma torch. One such example is the "Python-X" by Burlington Automation. The Python-X uses a common commercial industrial 6-axis robot arm to hold a standard modern high definition 260 amp plasma torch, which can perform many functions previously performed by different tools. The Python-X replaces up to seven separate machines, and its single plasma torch can make holes of many diameters, while also able to saw, cope, hard stamp, mark lines, cut small attachments, and add bevels and weld preparation. According to readily available promotional material, the Python-X uses twenty percent of the floor space of a typical beamline drill and saw, needs twenty percent of the processing time, and costs twenty percent as much, and produces high quality bolt holes approved for structural joints by AISC (American Institute of Steel Construction).

The Python X machine is a development of traditional beamline drills with a work center concept and a system which pushes or pulls the beam through for processing. While this machine contains many innovations, and the development of the machine has proven that plasma torches can correctly sever, shape, drill, and mark long steel product, there are serious limitations which remain from the beamline approach where a beam is fed into the stationary machine in steps for processing. That is, the machine is generally stationary, whereas the beam (long product) is moved through the machine.

Because a machine like the Python-X is NC programmable, it can directly process from computer files without any manual layout, saving perhaps one hour of skilled labor per beam, while also eliminate the risk of human error. The present systems and methods described herein take advantage of the usefulness of this machine, as well as modern plasma torch innovations, but according to a fundamentally different inventive concept, as explained below. In other words, the present systems and methods do not merely recreate the beamline concept.

SUMMARY OF THE INVENTION

The invention described here uses plasma torch technology, but also utilizes a uniquely different approach to handling and manipulation, where the beam does not move, but the machine does move relative to the stationary beam. By adding a 2-axis torch (AZ, where A tilts in the YZ plane) or a 3-axis (ACZ, where the torch direction is defined by azimuth C and tilt from the vertical A, as in FIG. 4) pantograph bevel head (FIG. 3) to the 2-axes (XY) standard gantry profile cutter (FIG. 1), the same functions can be performed at little or zero additional cost over a standard gantry plate cutting machine. These improvements eliminate the limited reach problems of a fixed location robot aim, while also significantly reducing the amount of equipment required to move the beam through a work center. According to the present application, no additional equipment is required to move the beam while processing, and the structure of the torch holder is not necessarily critical either, as long as the torch can be manipulated in at least the AZ axes and preferably the AC and Z axes. The FastCAM three-axis pantograph torch holder is shown in some of the drawings to illustrate a working embodiment of the present systems and methods.

In an embodiment, a method of processing long product on a numerical control machine including a gantry, a cutting bed, and a gantry holding a cutting torch, includes the steps of moving the gantry over a stationary long product on the cutting bed while cutting the long product with the cutting torch to process the long product. The cutting torch is capable of moving in at least the X-, Y-, and Z-directions relative to an arbitrary coordinate system defining the dimensions of the long product.

In an embodiment, a system of processing a long product, includes a machine bed, a gantry holding a cutting torch, the cutting torch for cutting a stationary long product on the machine bed, a numerical control machine including an NC controller for controlling movement of the gantry and cutting torch relative to the machine bed, and means for holding the long product stationary on the machine bed, in a lengthwise direction of the long product and machine bed, while a cutting operation is performed on the long product by the cutting torch. The gantry is moveable along a substantial length of the long product and machine bed in the lengthwise direction.

The present gantry concept provides all the advantages of using a plasma torch for all the functions of a drill, coper, saw, hard stamper, marker, etc., but with a profound difference: the present embodiments are capable of achieving all the advantages of a fixed work cell based robot arm, but at very little, if any, additional cost above the purchase of a normal large gantry plasma cutter with a bevel head. Whereas the Python-X machine is advertised to replace seven different machines, including a small plate cutter, the present embodiments are capable of advantageously realizing a full size plate cutter. Such a large plate processing machine conventionally is required even with a machine like the Python-X, but the present embodiments allow for the complete elimination of a specific beam processing machine. In this way, one single gantry machine can process all long steel products, from flat plate to pipe, as well as sections like I-beams.

The present embodiments further differ from a machine like the Python-X, in that the present beam need not be moved at all, and may stay still on the machine bed while being processed from end to end. In fact, a beam according to the present embodiments may never need to be physically handled at any stage in processing, and can remain stationary at all times, supported above a standard cutting bed. In an embodiment, it may be desirable to physically touch the beam lightly in places with the torch in what is sometimes referred to as "ohmic contact," in order to measure and establish important dimensions of the long product.

Use of a laser precision distance measuring device may also be desirable, in an embodiment, for use with the bevel head shown herein. Use of a laser measuring device could advantageously allow for beam processing without the beam ever having to be touched.

The gantry approach shown herein also advantageously allows a machine according to the present embodiments to be very light weight compared with traditional beamlines and saws which use large reactive forces, and thus were required to weigh many tons and require expensive flooring and installation. According to the present embodiments, however, the same handling equipment can be used to process beams as is used to process plates, so there is little or no additional expense in handling and no additional beam rolling systems will be required. In an embodiment, simple wooden blocks under a beam would allow for full processing from at least the top and sides of the beam. The touch ohmic contact system might be useful on occasion, but in principle, the present embodiments may allow processing that will never touch the long product, and therefore eliminate the need for clamping, or possibly even manual alignment with the machine axes, as it is possible to align the NC axes with the main axis of the long product.

The present stationary product embodiments thus further advantageously eliminate the conventional need for additional hydraulics, rollers, probes, clamps, and push or pull systems for the beam with rollers under the beam. The Python-X machine in particular requires rollers that have to automatically fold down in the work area if the torch has to cut close to the bottom of a flange, thereby adding to the complexity and cost in moving parts of such a machine. The present embodiments, however, may advantageously eliminate the need for such additional moving parts.

In effect, the invention of gantry beam processing has removed the limitations of reach of the industrial robot while being able to claim the same advantages of using a single plasma torch to replace a host of high force contact tools.

Additionally, the Python X and other conventional beam-line machines require a "work cell" in which all processing is done, that is, an area close to the center of the machine where a robot arm is based. In this central work cell area, the beam is unsupported, thereby also limiting the minimum length of the beam which can be processed while unsupported. According to a present embodiment, however, the long product may be fixedly, or permanently supported at fixed points 162, by means which can be as simple as pieces of angle iron. In a view according to an embodiment, the NC control can also indicate to the operator the places in which supports are to be placed, thereby further eliminating the need for expensive automation.

At the same time, the NC control may also be able to activate any pneumatic or hydraulic system, if desired, to support the beam at locations which would not interfere with processing.

In an embodiment, as shown in FIG. 1, a conventional Gantry 150, Bevel head 127, and NC control 135 may be used both for plate processing and processing of all long product without additional mechanical changes. According to the present embodiments, with an addition of, for example, a 3-axis bevel head, as shown in FIG. 1, the machine can not only perform three-pass precision weld preparation, but may also advantageously function as a 5-axis machine with essentially unlimited travel in the X direction, and may be suitable for processing all long product, including beams and tubes.

As discussed above, real estate is expensive in a factory setting, and usually must be kept clean, sheltered, and heated, while requiring heavy concrete floors. According to the present embodiments, however, the total length of the gantry bed 142 only has to be equal to the length of the beam itself. In contrast, in the Python-X example, the traditional beam line and work cell approach requires the machine length to be double that of the beam or the long product. Thus, irrespective of the amount of space saving the Python-X could realize over other conventional systems, methods and systems according to the present embodiments will still be able to reduce the amount of space required over the Python-X by at least half.

Furthermore, the present embodiments are additionally capable of processing very short sections of product, thereby further enabling the nesting and processing of multiple sections from a single long beam, while also achieving substantial material and production savings not available on any conventional machine or system. Machines which push and pull long product are typically unable to handle small sections or short end pieces. Nesting is also rare and difficult on traditional beamlines.

In an embodiment, long product processing with a bevel head on a gantry machine also may include the use of a mechanically simpler, and thus less expensive, 2-axis head (AZ) which may rotate only in the YZ plane (see FIG. 4, with C=90 degrees). This embodiment would be capable of performing many of the functions achieved by other of the present embodiments, but at a lower expense for much of the beam processing.

Additional functionality can be achieved using a three-axis bevel head (ACZ) including:

1. The ability to add precision three pass weld preparation on plate which is not necessarily intended for structural fabrication;
2. The ability to add weld preparation to both long product and attachment plates used in structural applications. Such contours should keep the C axis of the torch square to the contour when cutting an arbitrary shape like a circle; and
3. The ability to add miter cuts. Miter cuts are saw cuts at an angle to the web and flanges (e.g., element 503, FIG. 5a). A 2-axis head may achieve some miter cuts, but an inability in aligning the torch tilt plane C with the direction of cut is a significant limitation at the point where a cut must be made from web to flange (e.g., element 580, FIG. 5d). Without this ability to align the torch body with the miter angle, reproducing a bevel angle at 610 and the smooth join with the miter 603 (see e.g., FIG. 6) would be effectively impossible.

Similar to plate cutting applications, height control is also an important issue for long product processing. In long product processing though, there is also a problem for the NC control having to handle the serious and substantial manufacturing variations which exist in all hot rolled long product. Because such variations are not a consideration in plate processing, conventional plate processing machines are not capable of resolving such substantial variations for long product. The processing of plate and beam are generally considered to be two different fields, and often two different factories for both processes. Steel fabrication of tractors, boilers, boats, and trucks, for example, is very different from the fabrication of steel buildings, bridges, towers, and structures, despite the fact that both fields often work with and process the same basic materials. The variation in shapes, as shown in FIG. 2, will often determine whether material will have to be processed as plate or long product.

In long product, the complex and varied shapes are typically rolled from hot steel. The hot steel rolling process is fundamentally an inexact process. Steel mills must conform to the ASTM A6 specification as stated in AISC's Manual of Steel Construction, 13$^{th}$ Edition, which sets out the acceptable variance for member length, straightness, camber, sweep, and cross section of product. Illustration of such terms is shown in FIG. 7. Cross section properties further include overall depth and width, flange and web thickness, and flange out-of-alignment.

Beams that are subject to processing are also known to suffer from substantial dimensional variation, prior to processing, from desirable ideals. Such variations include camber, thickness of all faces, twist and tilt of flanges relative to the web, and more. With respect to pipe long product, such variations may appear in the cambering, cross sections not being circular, and varying thickness. Beam long product can vary in even more ways. While it would be ideal to presume that the long product to be processed by the machine is straight within the limits of the standard, variations that are actually and regularly seen in practice are so significant that programming to operate the machine cannot be rigidly fixed to treat all product the same. Since all hole positions have to be relative to the edges or the middle of the section being processed, inflexible programming cannot compensate for a hole that is even slightly out of position. Not only must the accuracy of positioning one hole relative to another be considered, but also must be the accuracy of the distance of the hole from the defining characteristics of the chosen shape of the product.

In this respect, the present embodiments represent yet another improvement over conventional gantry systems having NC control. Although conventional gantry flat plate processors are theoretically able to achieve tolerances of 0.1 mm with a plasma torch, and as much as 0.01 mm with a laser torch, the variations in the incoming product alone are known to be as high as 5 mm. Thus, a fixed NC program using conventional NC control will not be able to process long product within commercially acceptable tolerances when product variation is taken into account. Each position for a bolt hole has to be specified for the standard profile as given by the manufacturer and used by the designer, however, each position must also allow for incremental and substantial variations to the geometry relative to the specific measurement points on the actual product that is presented for processing. Conventional NC gantry systems are not capable of achieving this dynamic adjustment that would be necessary for processing a hot rolled long product. Similarly, conventional beamline systems measure the long product using a series of probes, and/or ohmic contact (discussed above), and then must adjust the processing according to the actual positions measured.

The NC control must handle such beam variations by measurement, since no two beams will conform to the same dimensional tolerances in practice. The present embodiments therefore represent a further improvement over conventional plate processing NC control where thickness variations do not affect NC program geometry. Accordingly, conventional 2-axis NC controls have been inadequate for beam processing. According to the present embodiments, however, a 2-axis control system may advantageously be utilized to process long product in several ways that have been heretofore unrealized, and even more advantages may be realized according to the present embodiments by utilizing a 3-axis bevel head.

The incorporation of a 3-axis bevel head with a beam processor is neither obvious nor simple. As with weld preparation, conventional NC controls for plate processing are limited to two axes. Moreover, the use of bevel heads in the field is still rare, being fitted to perhaps less than 1% of the world's plasma profilers. Additionally, conventional bevel heads are mechanically limited to a tilt maximum of 45 degrees and are not equipped with NC controls capable of functioning according to the present embodiments. Only recently has a bevel head been disclosed, in copending U.S. patent application Ser. No. 13/427,513 to the present inventor, that does not suffer from conventional bevel head limitations, and is capable of rotating freely up to, and past, a torch tilt of +/−90 in the YZ plane.

As disclosed herein, the present embodiments are not limited solely to use of the specific pantograph bevel heads disclosed in the copending patent application. The present embodiments though, are capable of utilizing such an improved bevel head to achieve advantageous results not realized by conventional beam processors or NC gantry systems. As discussed above, several of the present embodiments are able to tilt in the YZ plane from −90 to +90, and could thus still achieve significant improvements over conventional systems for most hole and penetration cutting functions on a standard beam. In such applications, processing could be at a fixed tilt of 90, 0, or −90. Additionally or alternatively, the processing of many sections of a beam could be viewed as a series of 2D applications, at least as far as the cutting of holes and the cutting or severing of product square. With respect to creating miters across the web, however, an ability to swivel the torch in the azimuth C can be of significant importance, as it would also be for adding weld preparation to beams and/or attachments.

As with plate cutting, height control of the distance of the torch tip from the long product is also a very important consideration regarding cut quality. It is estimated that more than 99% of all current steel plasma cutting is done using a vertical torch. Accordingly, all of the logic, plumbing, NC control, and height control (Z) associated with such machines are based on the assumption that the torch is vertical, or in rare cases at most, 45 degrees from vertical.

Although the Python-X machine, discussed above, is capable of utilizing a plasma torch near to a horizontal position, the Python-X system does not function with a standard gantry, or in a standard NC control/standard torch height control, such that a torch can cut in the horizontal plane. In conventional gantry systems, the height control Z axis is not an actual programmable NC controller axis, but instead a separate and independent closed loop feedback system based on arc voltage, which can be turned on or off by the NC control, but is otherwise an independent height control. Accordingly, such bevel heads would not be suitable for long product processing.

According to an embodiment, however, a pantograph bevel head according to the copending patent application may be a self-contained 3-axis bevel head with A, C, and an its own integrated Z axis (see FIG. 4). In an embodiment, the Z axis could also or alternatively be physically external to the device, but should still be programmable as a real similarly to the X- and Y-axes, and/or the A- and C-axes, and not be utilized as a pseudo-axis simply for height control of a vertical or tilted torch. To cut bolt holes when flanges are vertical (see FIG. 1), circles in the YZ plane need to be created on vertical surfaces. For the processing of an unequal angle (see e.g., element 230, FIG. 2) in practice, the plane of cutting might be neither horizontal nor vertical. In some such cases, the torch may be held at right angles to the cut surface.

The pantograph bevel head described above further has an advantageous constant focal point for weld preparation work to avoid involving the major machine axes in changing of azimuth and tilt values. The pantograph bevel head is thus useful for high quality precision weld preparation in flat or near flat plate as the torch tilt (A) and azimuth (C) can be changed smoothly without moving the machine axes in (X,Y). The torch body thus need not rotate when changing A or C.

According to an embodiment, the present inventor has discovered an improvement to use of the pantograph bevel head described above, an improvement that advantageously renders such a plasma torch holder particularly useful for long product processing. In an embodiment, the plasma torch can be pushed farther out past its focal point in order to clear the supporting control box (see, e.g., element 565, FIG. 5c) when the torch is horizontal for cutting holes in the flanges. As a consequence, compensating XY movements should be introduced if A or C are changed. However, since most cuts are in the flat XY or vertical XZ planes, and may require only two axes with a fixed torch angle, this movement past the focal point may be sufficient for long product processing. The torch can then be returned to the correct focal point position (see e.g., element 310, FIG. 3) for general plate processing including precision weld preparation. According to this improved method, the pantograph bevel head of the copending application can be used for all long product processing described herein, and one gantry NC machine can be similarly used for all such processing applications.

More specific details of sawing, mitering, hole drilling, line marking, hard stamping, and programming are otherwise known in the art and not further described herein. Processing of all the sections of long products, as illustrated in at least FIG. 2, may often be mathematically reduced to a more universal language describing a series of movements with axes XYZAC (see FIG. 4) which can consider positions near the tip of the torch (XYZ), as well as the angle and azimuth of the torch body (AC), independently of the physical structure of the processing machine. Such programming can then be effectively the same for a robot or the present embodiments as it describes the position orientation of the cutting torch in a series of movements to achieve the same result. The specifics to achieve such programming are then a matter for the internal software of the NC control and the particular mechanical axes. When utilizing a gantry system, the XYZ of the canonical form may correspond precisely to real axes. The AC axes though, will require a mathematical transformation from the real axes of twist and tilt of the pantograph for a given bevel head.

In addition to the advantages according to the present embodiments discussed above (i.e., the elimination of costly roller systems for moving long product, removal of the minimum length which can be processed, etc.), the present embodiments are still further capable of rendering the specific sequence of processing unimportant. Conventionally, the sequence of processing was a major restriction, due to the sequence of tools and the need to push and pull the beam. According to the present embodiments, however, individual holes may be advantageously placed before or after the sawing operations.

Yet another advantage according to the present embodiments is the ability of the present systems and methods to utilize a plasma torch where conventional machines require a special drill. Conventional beamline machines require a special drill for each required hole size, and such special drills must be individually procured, maintained, and fitted when required. According to the present embodiments, however, a plasma torch may be utilized to cut any size and shape of drilled holes, and even square holes. The cost of ownership and maintenance of a machine according to the present embodiments is thus dramatically lower than the conventional machines and systems. Furthermore, as discussed above, beamlines systems and their subsets come in many sizes and prices. According to the present embodiments, however, a single gantry plasma machine may be able to process any size component, depending on the strength and weight of the bed used for support. The present embodiments thus advantageously enable long product processing capability to the smallest of factories, while further providing full capability of plate processing, including complex multi pass weld preparation, on all products.

Pipe long product (including RHS which is a form of pipe flattened to create a rectangular cross section) can present special considerations not necessarily considered when processing other long product. For example, in simple cutoff and cutting of penetrations without bevel, pipe can be processed by simple rotation on an existing gantry machine with a pipe rotator under the gantry (see e.g., element 150, FIG. 1) instead or as well as the plate bed (e.g., element 140). Where such pipe rotation is required with a gantry machine processor, the cutting torch is typically held vertical. Although such pipe processing on a gantry machine is known, such processing cannot conventionally be achieved on the same single machine that can process other types of long product. In such pipe processors that hold the torch vertically, traditional vertical height control is used, and thus the torch is never horizontal. Bolt holes are rarely drilled by such processors, and the resultant assembly problems are also quite different from those experienced with other long product. These problems though, can be addressed by the present systems and methods that are equally capable of addressing the problems associated with other long product.

In an embodiment, a single multi axis NC control (e.g., element 135, FIG. 1) can be programmed with software that will allow the same system to be used for all of the above described types of processing, for both plate and long product, as well as other types of product that one of ordinary skill in the art will understand after reading and comprehending the present application. The development of the particular software necessary for such NC control, however, may be extensive, and the present inventor envisions further innovations drawn specifically toward methods of effectively coordinating such a diverse array of operations within a single machine or system.

In some conventional plate processing systems, some manufacturers have begun to use 2D plasma gantry plasma cutters for processing of a web only, and then only for normal vertical plasma cutting that cannot be accomplished with a drilling machine. In some conventional long product processing systems, gantries are now used for producing general cutouts, such as splitting I beams into two T sections, and also "castellation," where a beam is split and then welded as a taller, lighter beam. These conventional operations should not be confused with the more advanced long product processing operations disclosed by the present embodiments. These conventional operations may be performed by a machine operation only two-dimensionally with height control. These conventional operations only perform horizontal cutting, and are not capable of drilling bolt holes. Long product that is processed according to these conventional operations would still require further processing, typically on a separate machine or system, for automatic or manual drilling. Such conventional operation systems are incapable of adjusting the position of cutting torches, by continual measurement and adjustment for example, for variations in the product dimensions and shape. Bolt holes, for example, cannot easily be moved from their original marked positions once the cutting process has begun, and once drilled or cut in an undesirable position, the holes cannot be enlarged or slotted in practice without weakening or compromising the structural integrity of the product. In applications where slots are required, slots will be specified and the consequent weakening of the beam taken into account in the strength calculations.

BRIEF DESCRIPTION OF THE DRAWINGS

FIG. 5c illustrates further processing of the embodiment of FIG. 5a, by plasma cutting the right flange of the beam.

DETAILED DESCRIPTION OF THE DRAWINGS

Figure 1:
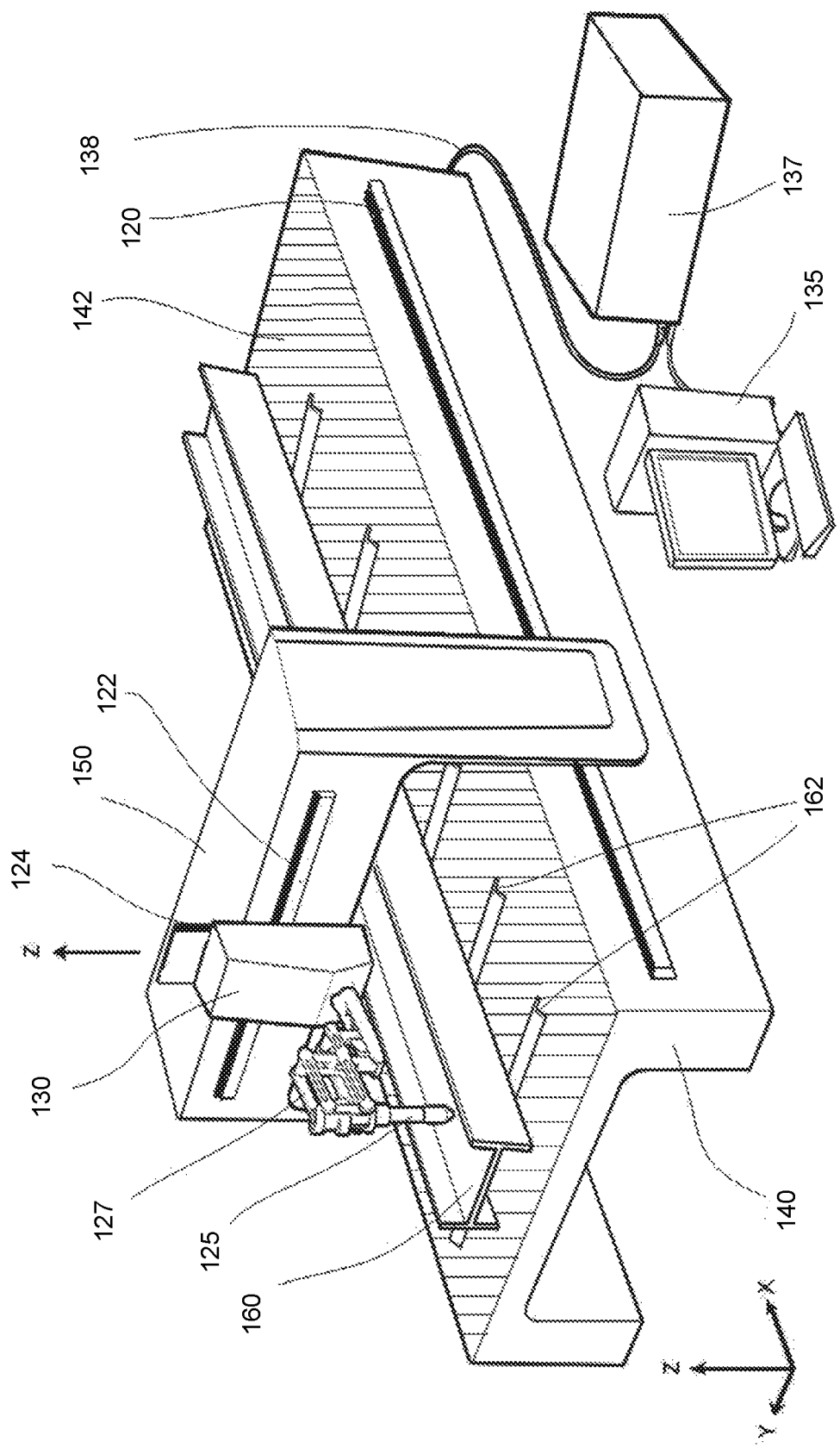
FIG. 1 illustrates a 5-axis gantry style plasma cutter using a 3-axis cutting head processing an I beam on a standard machine bed, in an embodiment.

Described herein are methods and systems for processing long products (cross-sections of which can be seen in FIG. 2, for example) on a gantry plate cutting machine, as best seen in FIG. 1.

FIG. 1 illustrates a 5-axis gantry style plasma cutter processing an I beam 160, for example, on a machine bed 140, 142. In this example, the machine bed 140, 142 can be a standard gantry machine bed. Cross beam 150 is referred to herein as a gantry. The gantry 150 may support a plasma bevel head 127, which in turn may hold a plasma cutting torch 125. In this example, angle iron pieces 162 may be used to support the beam 160 to allow the torch 125 to access the bottom of the beam flanges (not numbered). FIG. 1 further illustrates an NC controller 135 having an amplifier 137 that may provide power for control of the XY axes, which may be included with the system shown in this example.

Figure 4:
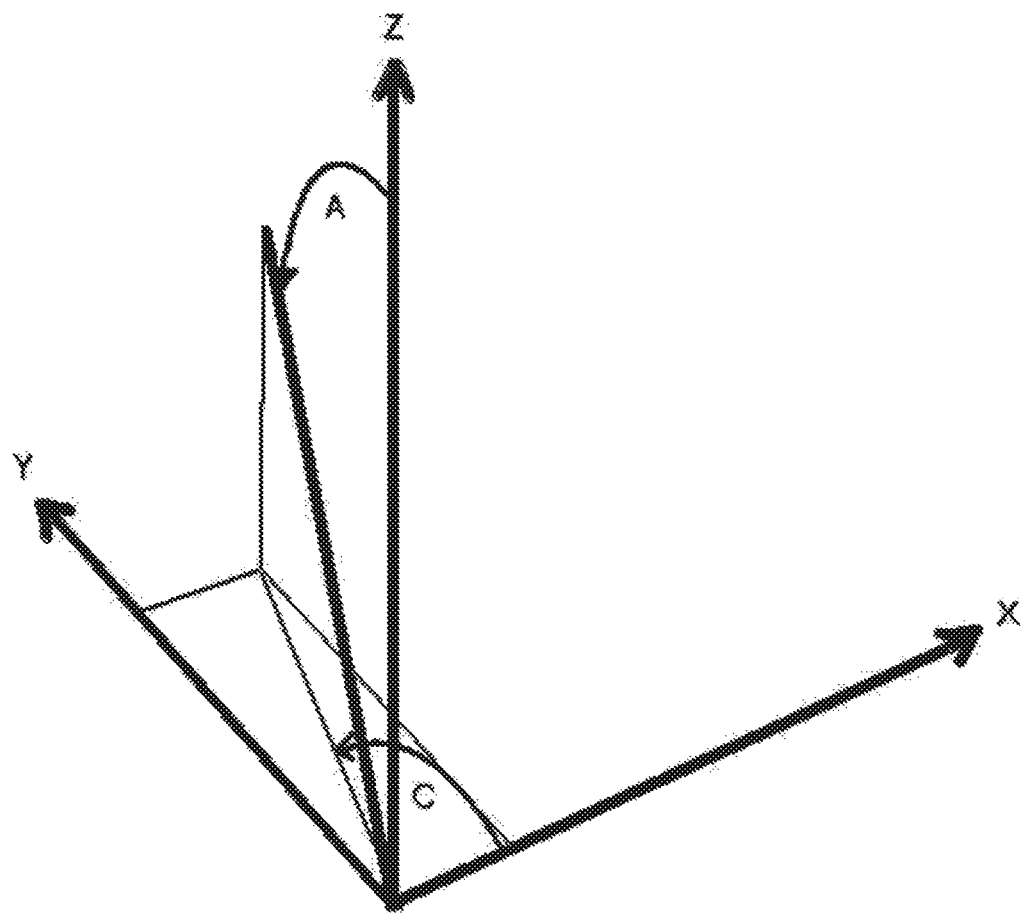
FIG. 4 illustrates an example of programmable independent axes XYZAC, in an embodiment.

Operation of the FIG. 1 system may be controlled by the NC controller 135, which in this example may be a standard PC having at least one driving amplifier 137 for the X-axis 120 and the Y-axis 122. NC controller 135 may further control operation of the bevel head 127 for the Z-axis as well as internal AC axes (not numbered, best seen in FIG. 4). In this example that utilizes the 3-axis bevel head 127, the Z-axis may be integrated with a drive box 130 that allows up and down movement on a backplate 124 in the Z-axis direction. The drive box 130 may further include an internal triple amplifier (not numbered) that is capable of converting signals from the NC controller into precise positions along the Z-, A-, and C-axes. In an embodiment, the present inventor contemplates that many of the processes described herein can be performed using a single tilt angle A in the YZ plane. In an embodiment, the present inventor further contemplates operation of the system utilizing both tilt A and azimuth C angles, as best seen in FIG. 4.

In an embodiment, the plasma torch 125 may cut at its tip (e.g., cone 503, FIG. 5a) with a plasma arc of between 30 and 600 amps, depending on material thickness. In an embodiment, primary movement of the torch may be along the X- and Y-axes 120, 122, that is, along the horizontal plane of the bed 142. In this example, the X-axis is represented by a long axis rail (not separately numbered) of the machine on which the gantry 150 sits, and the bevel head holding the torch can be seen to also move along the Y-axis 122, which is represented by a short axis rail in this example (also not separately numbered). As described above, a typical positional accuracy can be at least +/−0.1 mm for plasma cutting.

As also described above, conventional XY plate processing machines control Z-axis movement, if any, by an independent machine or system utilizing Torch Height Control (THC). In such conventional systems, a controller (e.g., NC controller 135) would serve only to turn on and off the THC system. Such conventional systems, unlike the present embodiment, are strictly 2-axis XY machines. According to the present example, however, additional Z-axis movement along backplate 124 can be directly controlled by the same computer (i.e., NC controller 135) as the X- and Y-axes 120, 122. According to the present embodiments, therefore, synchronous and/or simultaneous control can be achieved along all three X-, Y-, and Z-axes. Collectively, these axes can be positioned to control the cutting tip (i.e., cone 503) of the plasma torch 125, and cutting point can then be approximately 8-12 mm from the point of the brass cone 503.

Figure 2:
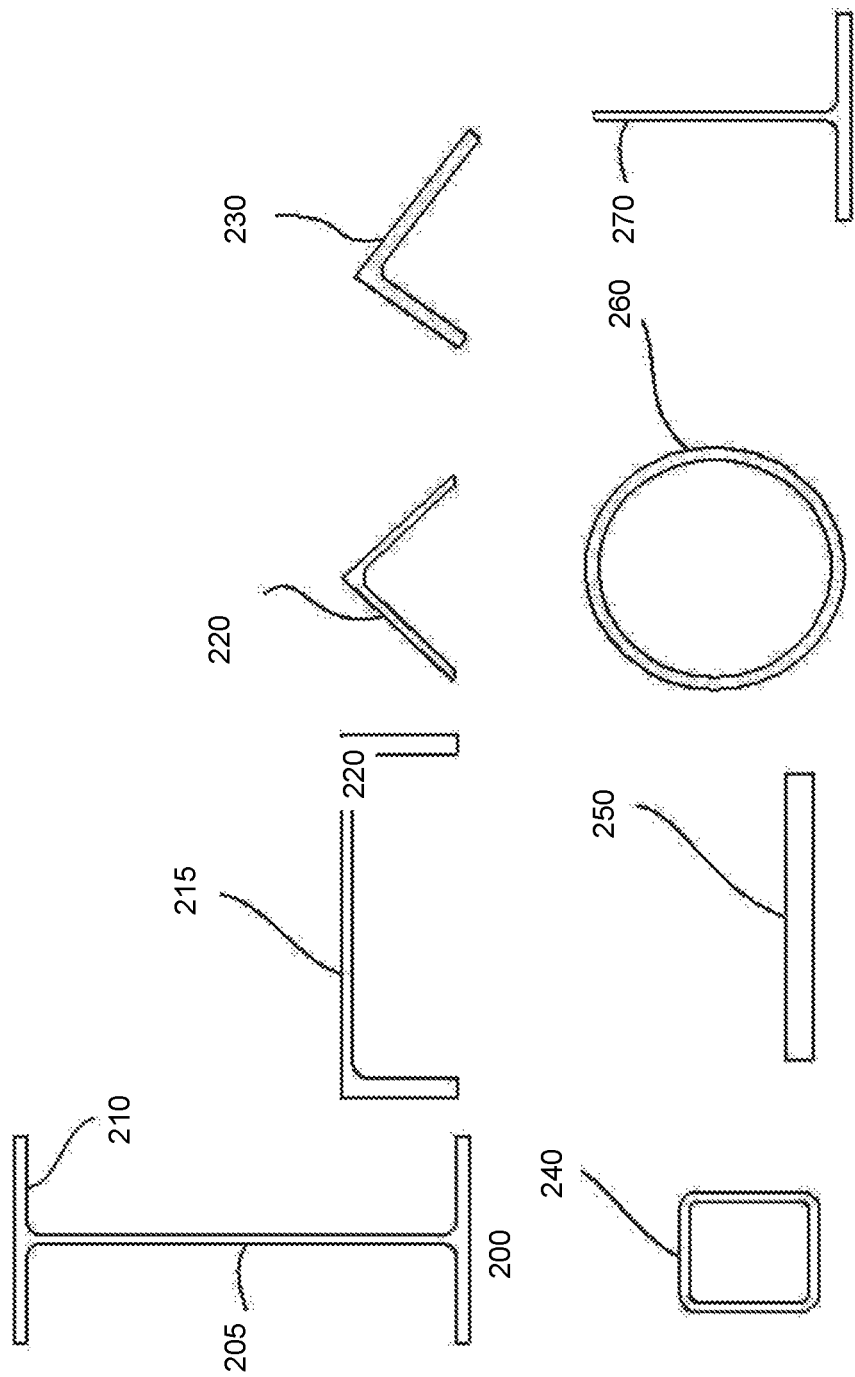
FIG. 2 illustrates cross-sectional views of several exemplary PRIOR ART long products.

FIG. 2 illustrates cross-sectional views of several exemplary long products. I beam 200, having web 205 and flange 210 is described most extensively herein, and is featured in several embodiments for purposes of illustration. One of ordinary skill in the art, after reading and comprehending the present application, will understand how the present systems and methods are unique and inventive for not only the other examples of long product shown in FIG. 2, but for other types of long materials known in the field. The examples shown in FIG. 2 are thus provided as an illustrative list, but are not meant to be exhaustive of all shapes of long product material that may be addressed by the present embodiments.

With reference to both FIGS. 1 and 2, I beam 200 can be considered to be a 360UB45 beam, in this example, for illustrative purposes. A 360UB45 beam is a Universal Beam which is 360 mm high and weighs 45 kg/meter. Specific descriptions of this type of beam though may vary from country to country and from mill to mill. Beam 200 could also be described as 360UB44.7, for example. In practice a given piece can have different names locally, and the I beam 200 may itself be described by its center piece, or web 205, and its flanges 210. For even such defined shapes, the web height and flange width, as well as the overall material thickness, can vary, as can also the weight per meter. Thus, for a given physical space, the strength and weight of the beam can vary in practice, and/or according to the requirements of the designer. For purposes of the present embodiments though, the discussion presumes that the shape of the beam is generally constant over its length. As discussed above and further below, the present embodiments are capable of operating successfully even where the shape is not constant over the length of the beam. The present embodiments may also be utilized in cases where beams are fabricated from cut and welded flat plate to create shapes that need not be hot rolled, in addition to product where the cross section can vary down the product's length.

Referring back to FIG. 1, the beam 160 may be placed on the machine bed 142 with the web horizontal (e.g., element 205, FIG. 2) and the flanges (e.g., element 210, FIG. 2) vertical to the bed 142. In this example, cutting, drilling, and marking of the beam 160 may be performed on at least three sides of the beam. The beam 160 should be supported above the slats (i.e., angle irons 162) of the plate cutting bed 142. In this example, the angle irons 162 allow the beam 160 to be raised above the bed 142 by a distance (e.g., element 560, FIG. 5*c*) to enable cutting at the bottom of the flange 210 without collision with a plate (e.g., element 575, FIG. 5*b*) of the bed 142 by parts of the bevel head 127 (as illustrated by distance 550, FIG. 5*b*). Other processes of lifting the beam 160, and/or maintaining a distance of the beam 160 above the bed 142, are contemplated by the present inventor without departing from the scope of the present application. In an embodiment, both ends of the beam 160 may also be cut prior to processing, in order to provide a more precise shape to the ends of the beam as compared with what may be delivered in practice, which are not known to be acceptably straight ends prior to processing.

In this example, supports (i.e., angle irons 162) need not be placed at the ends of the beam 160. In an embodiment, supports 162 could be placed at regular intervals under the beam, but such placement could raise problems when a horizontal torch (i.e., torch 125, see also FIGS. 5*b*, 5*c*) is intended to cut to the bottom of the flange. In an embodiment, the NC control 135 can examine the processing NC program for each beam that may require patterns of drilled holes, and/or other operations at specific points along the length of the beam 160. In this example, NC controller 135 is further able to calculate precisely where support is both needed and/or best utilized, and optimally where the support will avoid collisions with the torch holder operating on the flanges. In an embodiment, support placement information can be manually entered into the NC program or automatically calculated by the NC controller 135. The NC program may, for example, reside in the NC controller 135, and may include a readable list of coordinates and commands using letters A-Z, as well as arguments in absolute millimeters. NC programs according to the present embodiments may significantly differ from conventional NC programming that is presently known.

In an embodiment, NC controller 135 may also read programming requirements in a 3D-specific language for beam processing, such as DSTV, discussed above, and convert the requirements into a sequence of XYZAC movements. According to this example, the controller 135 may convert a requirement to cutoff at a specific distance into a series of head movements which would achieve the same effect as an operation using a plasma torch. In addition to DSTV, the present inventor contemplates that the present embodiments may be utilized using other programming languages and file formats which provide portability from machine to machine, including the FPV file output format of the FastBEAM™ program by FastCAM®. Such additional programming languages convey better the results to be achieved by the controller as opposed to more explicit instructions on how the controller must perform individual movements.

Whether provided to the NC controller 135 externally or calculated by the NC controller itself, the NC program that guides the torch 125 may include XYZAC control that guides the torch cutting point (i.e., element 503) along the X-, Y-, and Z-directions on the surface of a product while controlling the torch orientation (AC) about a particular cutting point. In an embodiment, the NC program may attach a coordinate value to each address XYZAC. Such coordinate values can be absolute from an origin, or incremental from point to point. In an embodiment, additional reference points may be embedded as variables in the NC program language. In an example of this embodiment, these variables may be supplied by precision measurement of point along the beam 160 on an actual section of the beam that is intended to be cut, and then used to control the torch 125 to be adjusted for the exact position desired for particular holes. These additional steps of the process are not only unique to the present embodiments, but also of particular value with respect to hot rolled product, because the specific XYZ positions of hot rolled product have to be adjusted for unavoidably large differences between the ideal shape, and the actual mill product being cut, as is known to be found in practice in this field. Again, hot rolling of steel is not known in the field to be a precision process. Accordingly, natural thickness variations, twists, and cambers are frequently experienced, even with set standards. According to the present embodiments though, the NC program can be created to be relative to the ideal shape sought, but still enable measurement and adjustment to coordinates of the actual shape being processed.

Figure 3:
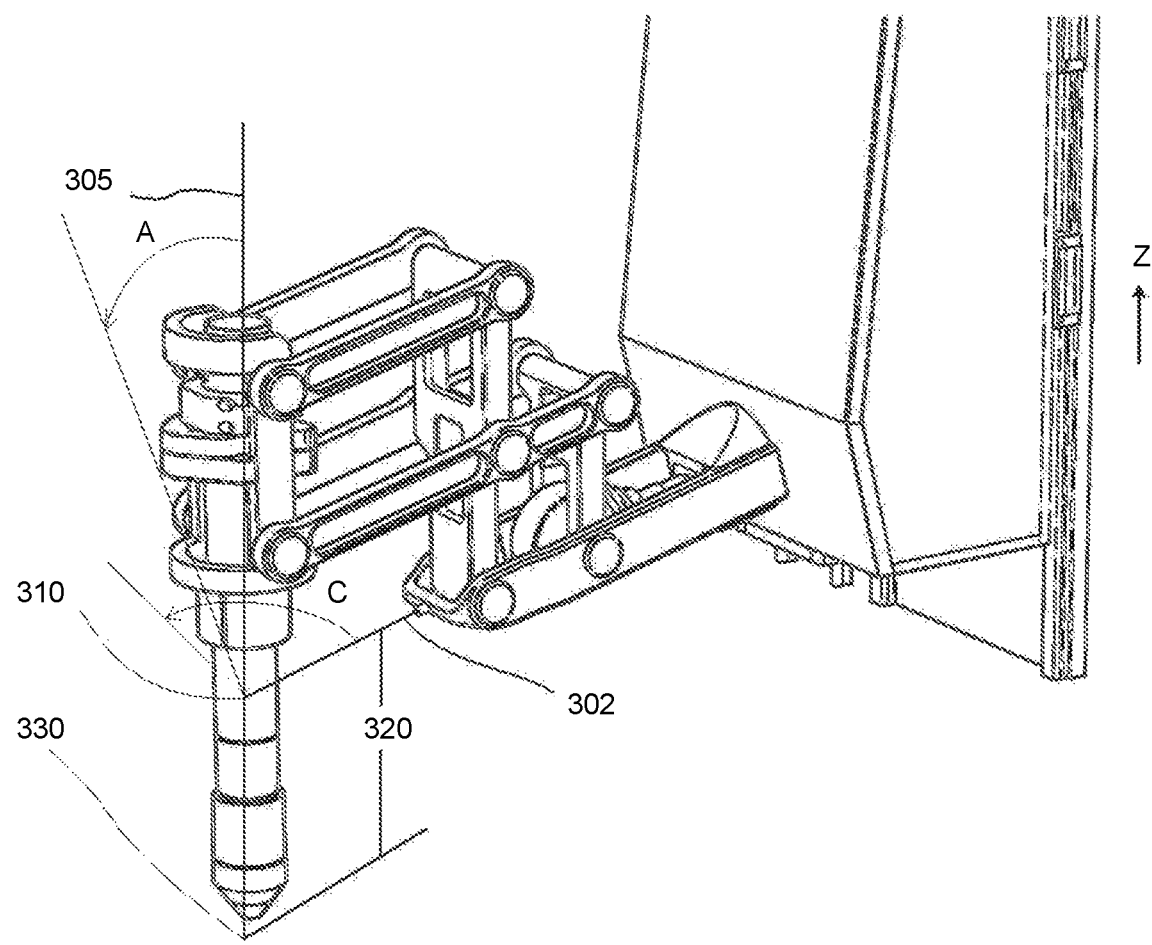
FIG. 3 shows an example of a 3-axis A C Z-axis pantograph bevel head torch holder, in an embodiment.

FIG. 3 shows an example of a 3-axis pantograph bevel head machine that may be used for plate weld preparation, in an embodiment. In this example, the torch (i.e., element 125, FIG. 1) is shown as extended from a focal point 310 to a new point 330 in order for the torch to be able to cut beam flanges (not shown) from both left and right sides with clearance along the sides (best seen in FIG. 5b, clearance 565). In this example, the multiple-axis pantograph bevel head (e.g., bevel head 127, FIG. 1) described above is illustrated. As shown in FIG. 3, the tilt value A is shown from a torch center 305 about the focal point 310. For the bevel head 127 to achieve maximum accuracy in plate beveling, the torch tip at point 330 can be positioned at the focal point 310 formed by the intersection of an axis of twist 302 and a line along torch center 305. According to this example, both C and A can be varied while stationary, i.e. without changes in X and Y. Embodiments that require the machine to move in the X- and Y-directions when tilting the torch, so as to keep the cutting point stationary, produce less smooth motion and thus less adequate cutting in corners and bevelled circles. Nevertheless, the present inventor contemplates that such less adequate systems (that is, mechanisms which allow tilt in only the twist axis 302) may still be integrated within the scope of the present embodiments to process long product in many, but not all, of the processing steps achievable according to all of the disclosed embodiments with respect to twist and tilt. A twist and tilt (AC) head, according to the present embodiments, is fully capable of advantageously realizing all of the processing steps that conventionally require a 6-axis industrial robot like the Python-X, described above.

FIG. 4 illustrates an example of programmable independent axes XYZAC, in an embodiment. In this example, the X- and Y-axes correspond to the physical axis rails 120, 122, respectively, shown on the gantry system illustrated in FIG. 1. In this example, the Z-axis also corresponds to the up and down motion along the backplate 124 shown in FIG. 1. Torch alignment axes A and C are notional in this example for illustrative purposes, and do not necessarily have to directly correspond to physical axes for tilt and swivel.

Figure 5A:
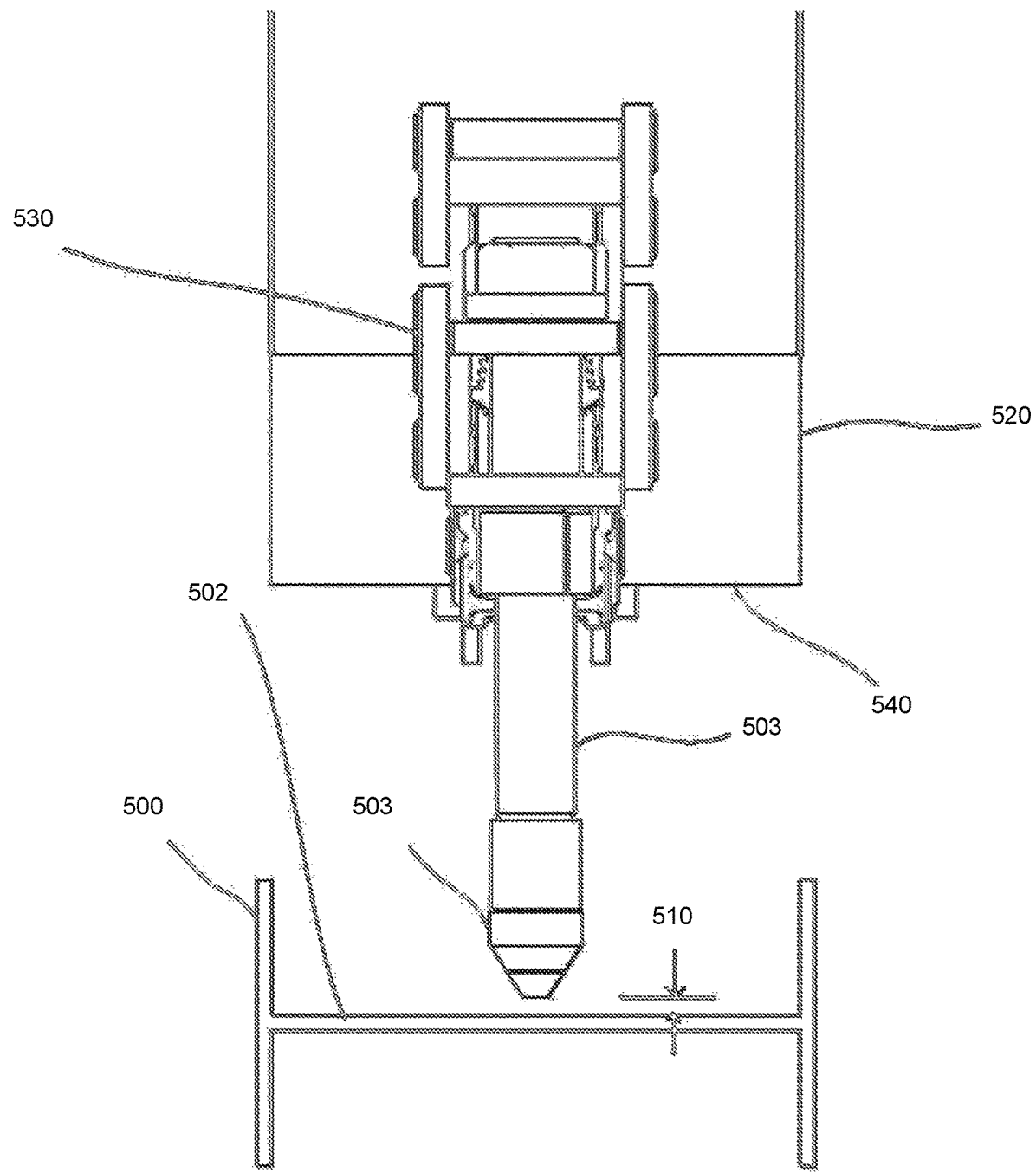
FIG. 5a illustrates an exemplary 360UB45 beam showing the beam being cut by a vertical plasma torch, in an embodiment.
Figure 5B:
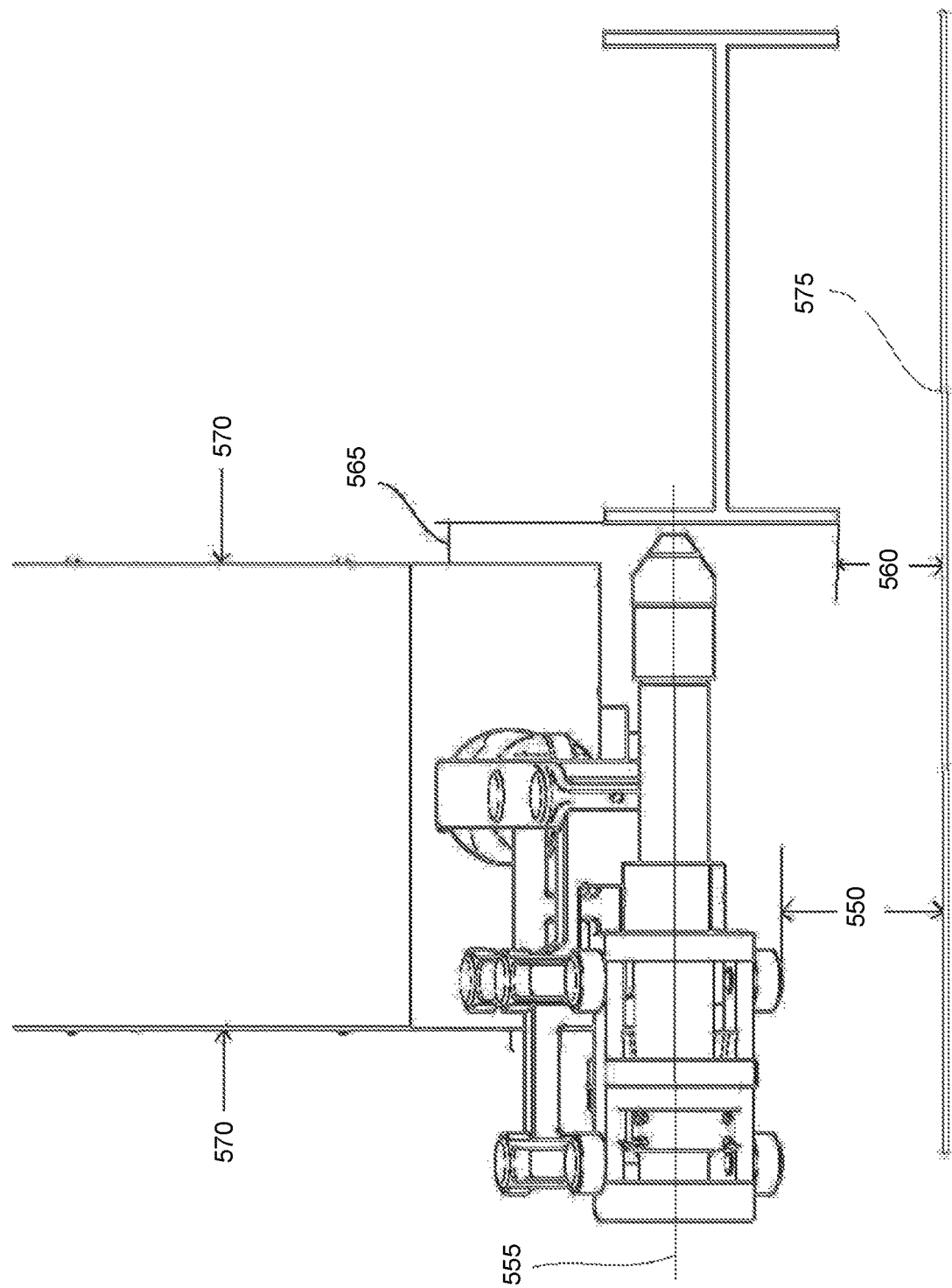
FIG. 5b illustrates further processing of the embodiment of FIG. 5a by plasma cutting the left flange of the beam.
Figure 5D:
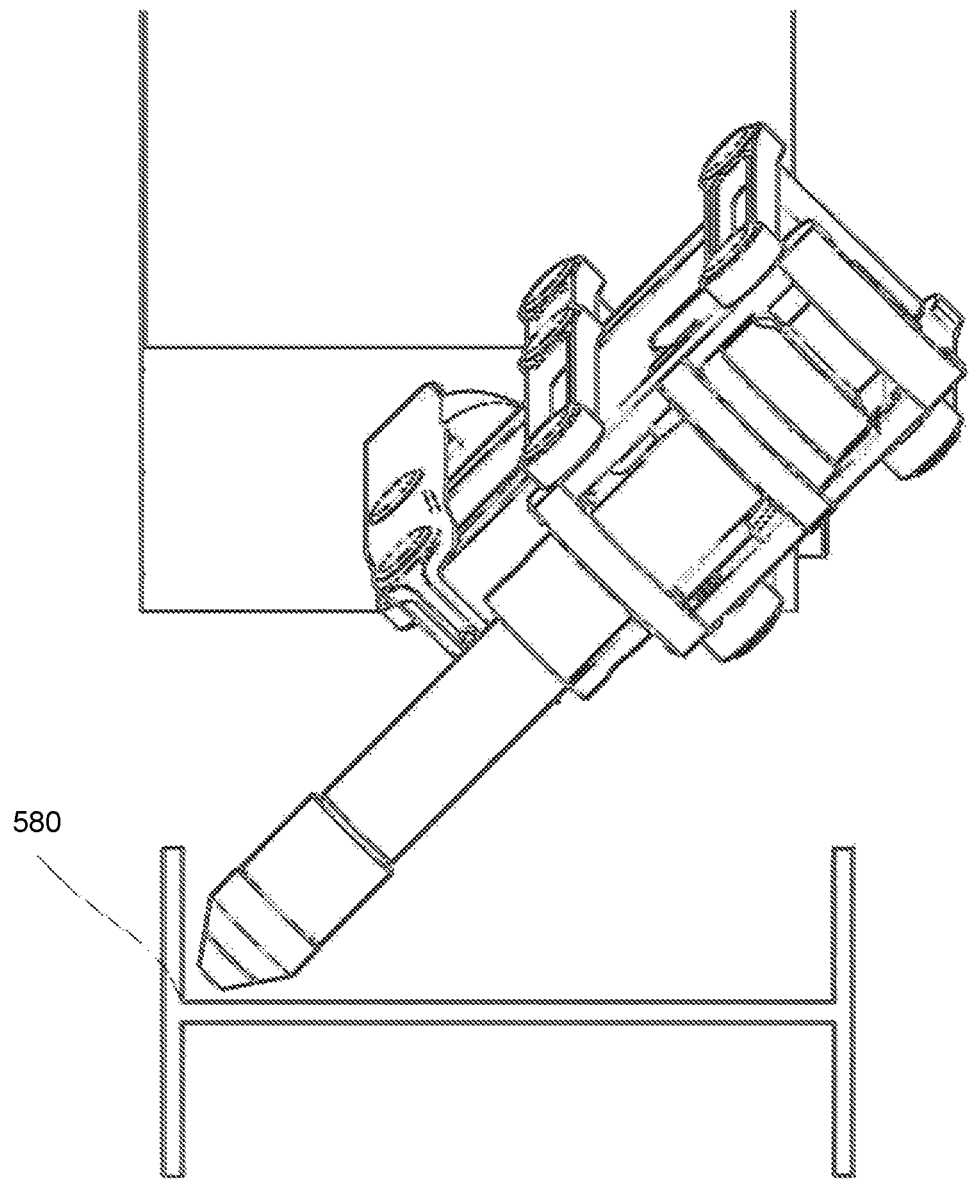
FIG. 5d illustrates an example of web cutting at a join between the web and a left-hand flange, in an embodiment.

FIG. 5a illustrates an exemplary 360UB45 beam showing the beam 500 being cut by a vertical plasma torch. FIG. 5b further illustrates the embodiment of FIG. 5a, seen from the left side of beam 500, and having clearances 550, 560 from the plate 575 and clearance 565 from the beam 500. FIG. 5c further illustrates processing of the embodiment of FIG. 5a, seen from an alternate side view. FIG. 5d illustrates an example of web cutting at a join between the web (i.e., element 205, FIG. 2) and the flange (i.e., element 210, FIG. 2), in an embodiment. A torch tilt of 30 degrees is illustrated in this example. For square cutting processes, the torch may stand or align in the YZ plane. For miter cutting processes, the torch should stand and align in the plane of the desired miter.

Referring back to FIGS. 3-5, the torch (i.e., torch 125, FIG. 1) may move down jaws (not numbered) of the bevel head (i.e., bevel head 127, FIG. 1) from the focal point 310 to new point 330. According to this example, the bevel head drive box 570 is able to clear the flange (i.e., flange 210, FIG. 2) by the clearance distance 565 (best seen in FIG. 5b). The present inventor contemplates further reduction in the width of the drive box 570 in order to reduce or even eliminate the need for clearance 565. In an embodiment, torch movements in the XYZAC directions may be coupled together, particularly when cutting in a plane other than XY, YZ, or XZ, where coordination of all five axes is particularly advantageous, according to the examples described herein.

This 5-axis coordination is more particularly useful when cutting circular holes for bolts, even though some bolt holes that may be cut only in the flanges or web of the beam may only require simultaneous movement in only two axes. In such examples, the feed rate in both axes should be identical to maintain circularity.

For cutting and marking the web 502 (best seen in FIG. 5a) the torch may be held substantially vertical to the web 502. A gap 510 between the torch tip 503 and a surface of the web 502 should be held constant for optimum cut quality. Such gap maintenance is similar to height control of standard gantry systems, discussed above, but need not be as problematic according to the present embodiments since many bolt holes may be created to have dimensions of only 22 mm across. Variation in height over such a small distance may thus be negligible according to the present embodiments. In an embodiment, it may further be desirable to avoid using known height control systems and methods while cutting small holes, particularly for plasma cutting applications. In an embodiment, larger holes or penetrations in beams may also be utilized to either lighten the beam, or to allow another element to pass through the beam without touching the beam. Accuracy of the shape cut according to these examples therefore may not be as demanding as what is required for conventional plate processing where the cut edges are used for welding and assembly.

FIG. 5b illustrates a process that may cut or mark bolt holes/penetrations along the left flange of the beam 500 shown in FIG. 5a. In this example, the plasma torch is shown held at a horizontal position, with the clearance 565 between the drive box 570 of the bevel head and the flange. The clearance 550 is shown between the torch holder (not numbered) and the surface 575 of machine bed below. The clearance 550 should be sufficient to accommodate supports (i.e., element 162, FIG. 1) below the beam 500. In an embodiment, portions of the supports 162 that may project past the flange of the beam 500 should not be present at the point where the torch has to cut the beam to the lowest point (not numbered) of the left hand flange above the clearance 560 between this lowest point and the bed surface 575. In an embodiment, a height of the lowest point of the beam 500 can be more than half the width of the torch holder, which in this example is represented by the height of the center line 555 minus the distance to the bed 550. In this example, these distances may be fixed and known. In an embodiment, the supports 162 may directly support the bottom of the flanges or the bottom surface of the web, or both. In practice, measurement from the top of the beam alone may provide for accurate assumptions of the web dimensions, but such top-only measurements would not be as reliable to predict the dimensions of the bottom of the flange. In an embodiment, where only the flanges are supported by supports 162, the width of the flange may be deduced from the height of the upper flange.

FIG. 5c illustrates an example similar to that shown in FIG. 5b, but from the opposite side flange. In this example, the torch is again shown in the horizontal position. In an embodiment, the gantry itself should be wide enough to compensate for the width of the beam when horizontal, plus at least twice the height of the pantograph torch holder, and also clearance for hoses and cables that may be attached to the gantry.

When cutting using a plasma torch, to achieve a cutoff similar to that accomplished with a saw, a number of slices can be made through both the web and the flanges of the beam 500. To effect this number of slices, the torch should be capable of tilting to reach the join between web and flange, as best seen in FIG. 5d. If the equivalent of a miter cut is to be made, where the "saw blade" is not in the X-plane, but instead at an angle, the torch should be capable of utilizing the AC alignments with the cutting plane, and tilt in this plane as illustrated in FIG. 5d. In this example, the adjustability of the 3-axis pantograph bevel shown is of particular advantage with mitered cuts. Unlike mitered cutting, a plasma torch is often only held horizontal or vertical when cutting in only two planes.

Figure 6:
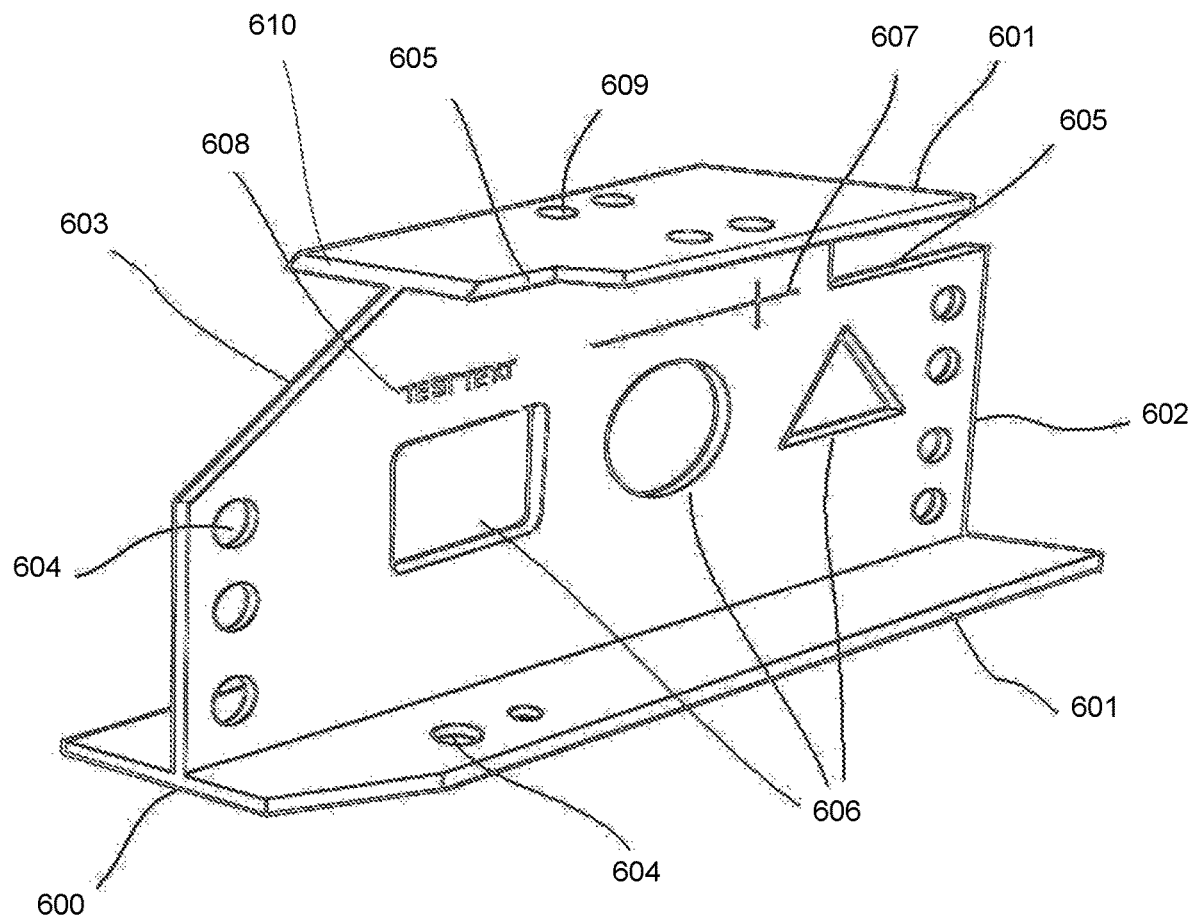
FIG. 6 illustrates an example of a test sample product showing the many processes which can be executed using a plasma torch including cutting, line marking, and deep grooving, in an embodiment.

FIG. 6 illustrates an example of a test sample product showing the many processes which can be executed using a plasma torch according to the present embodiments, including cutting, line marking, and deep grooving, as well as processes which can survive painting. These processes are conventionally only performed by hard stamping. In this example, elements 604 represent circular bolt holes. Holes 604 have to be smooth and straight, within tolerances, for practical use in the field of art. Penetrations 606, on the other hand, may be arbitrary shapes in the beam, which may be placed for making a standard beam lighter and/or to allow other pipes, beams, or plumbing to penetrate the beam (often without touching the beam).

When assembling a bolted beam structure, welding is common, but most cutting is to avoid contact between beams. Two classes of such cuts are illustrated in FIG. 6, as miters or saw cuts, as indicated by elements 603 and the continuation of angle of cut of the flanges at 610. A more complex cut, which would be impossible to accomplish with a saw, is known as a cope, and illustrated as elements 605. Copes are conventionally performed by oxy torches in a traditional beamline. According to the present embodiments, however, a plasma torch can also line mark the beam 600, which at low amperage need not cut all the way through the beam, but may instead be used to leave line marks on the surface, as shown by element 607, and/or mark the beam 600 with lettering 608 to identify or instruct in assembly. Additionally, a plasma torch utilized according to the present systems and methods is also capable of gouging the beam 600 to produce a deeper mark in the surface, which may be desirable similarly to elements 607 and 608, but will still be visible even after the beam 600 is painted. According to the present embodiments, a plasma torch can be used to perform all of the drilling, penetration, sawing, coping, mitering, and cutoff functions of conventional full-functioned universal beamline machines and systems, but advantageously perform with significantly better flexibility, lower expense, and lower weight than such conventional machines. Systems and methods according to the present embodiments are further capable of producing line marks text on long products, which conventionally must be performed by separate hard stamping.

Many other operations not shown in FIG. 6 may be performed according to the present embodiments, which are provided for illustrative purposes, and are not intended to be exhaustive. For example, slots, tapered holes, square holes for coach bolts, spot marks, and many other geometric shapes may also be achieved according to the present application. Text may also be left on the beam 600 in languages other than English. The advantageous utility of the present embodiments will allow for significant changes to, and simplification of, design criteria for construction and assembly methods. The present inventor contemplates that such relevant industry standards will change to accommodate the present systems and methods using a single tilt bevel head, as use of cold saws and band saws will become more obsolete.

Figure 7:
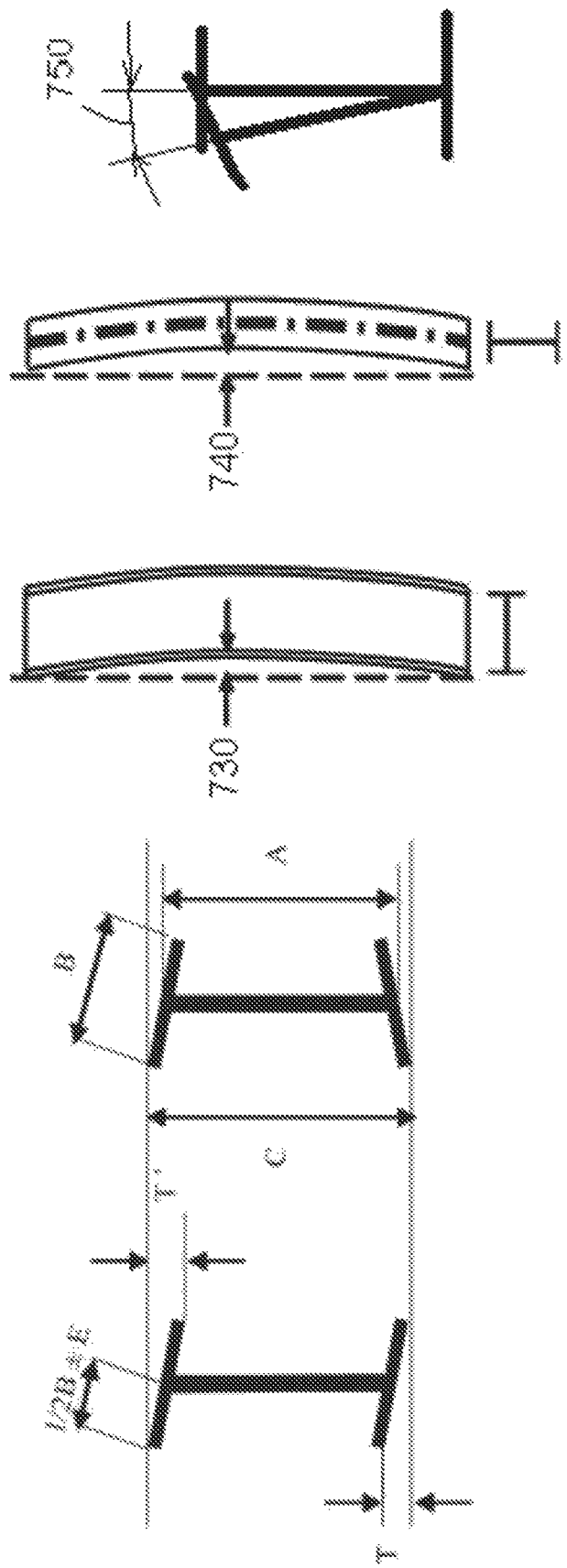
FIG. 7 illustrates variations that can be found in the shape of I beams.

FIG. 7 illustrates additional variations that can be experienced in the shape of I beams that are delivered prior to processing. As illustrated, the two left-most examples illustrate twists of the flanges relative to a vertical web. Example 730 illustrates a camber (web view) and example 740 illustrates a sweep (top or flange view). Example 750 illustrates a case where a twist in the web can travel down the length of the beam. In addition to these examples, long products are also known in the field to be delivered, prior to processing, with significant variations in width, height and twist, with all sections of the long product potentially having variations in thickness as well.

Such variations are typically measured in millimeters, or in twist and camber down the length of the beam at approximately 1/500 to 1/1000 of product length. Such dimensions may not seem significant at first glance, until it is considered that for a 10 meter beam (which can be common in the field) such variations may add up to a distance of 10 mm (1 cm) over the product length. Additionally, all of the potential dimensional variations may occur in a single product, thereby adding up to even more significant problems over the product length that would not be significant for conventional NC operation of plate material alone. An NC program, even after creation, must still allow for correction of actual measured distances. Reference points in the material should be chosen according to the use to which the holes are to be put.

For example, if the flanges of a beam are to form a floor in a building, it is necessary to specify bolt hole distances from the top flange. Conversely, if a bottom flange is to form a flat roof, hole positions must be referenced to the bottom flange. For column formation, the center of the beam will be used, and the dimensions of the center must be determined in each case by measurement across the beam at the X-distance along the beam.

When assembling bolted structures, the distance between bolt holes is critical, since the beams themselves generally do not touch each other. The dimensions of copes and miters are not as significant as the distance between bolt holes since the copes and miters are typically used only to prevent beams from touching. For columns, the distance to the center line of the beam becomes more critical. Such examples are not intended to be exhaustive, but to provide an illustrative explanation of how standard fixed NC programs, as typically run by a gantry NC plasma cutter, will not be automatically adaptable to beam processing, as according to the present embodiments, unless the processed beam is effectively perfect in all dimensions prior to processing, which is a rare and often impossible occurrence. Additionally, in plate processing, typically only the variation in material thickness, plus the accuracy of the outside profile, need be accounted for. In structural applications, apart from the bolt holes, miters, copes, cutouts, and end cuts described above, the actual cut shapes are not as critical for dimensioning tolerances as are the edges of the shapes.

Unlike a robotic beam processor using a fixed work cell and moving beam, the more universal systems and methods represented by the present embodiments are capable of acting as a full size plate processor, including multi pass weld preparation. Conventionally, separate machines and systems are required to perform such additional or separate processing.

The present inventor estimates that the actual number of plasma and oxygen torch gantry machines in use around the world is approximately 250,000, and increasing rapidly as automation and machine prices drop. For example, some such machines have dropped to $10,000 USD from original prices of $1Million USD. Such more affordable machines vastly outnumber the few thousand specialized, very large, beamline systems that are presently used only in large factories. The present systems and methods thus enable the less expensive and more populous gantry systems to be converted to universal plasma processing of long product competitive with the large beamline systems, while keeping within the cost and design advantages of conventional gantry systems. Additionally, systems and methods according to the present application can also process plate material, and will significantly change the degree of automation available in structural steel construction, and thus reduce the cost and speed of building worldwide.

Combinations of Features

Features described above as well as those claimed below may be combined in various ways without departing from the scope hereof. The following examples illustrate some possible combinations:

(A1) A method of processing long product on a numerical control machine including a cutting bed and a gantry holding a cutting torch, the method including the steps of: moving the gantry over a stationary long product on the cutting bed while performing a step of cutting the long product with the cutting torch to process the long product, wherein the cutting torch is capable of moving in at least the X-, Y-, and Z-directions relative to an arbitrary coordinate system defining the dimensions of the long product.

(A2) The method denoted as (A1), wherein the long product is held stationary during the step of moving by a weight of the long product.

(A3) The method denoted as (A1), wherein the long product is held stationary during the step of moving by clamps or fixed holding structures.

(A4) Any of the methods denoted as (A1) through (A3), wherein the step of cutting includes at least three multi-pass cutting substeps, wherein at least one of the multi-pass cutting substeps includes further processing of the long product to include weld preparation along a cut of the long product provided by a prior one of the at least one of the multi-pass cutting substeps.

(A5) Any of the methods denoted as (A1) through (A4), wherein, during the step of moving, the gantry moves along a lengthwise direction of the long product relative to the cutting bed, while the long product remains stationary in the lengthwise direction relative to the cutting bed.

(A6) Any of the methods denoted as (A1) through (A5), wherein a C-axis of the cutting torch is held square to a contour of the long product during the step of cutting.

(A7) Any of the methods denoted as (A1) through (A6), wherein the step of cutting includes cutting the long product in a horizontal plane generally parallel to a plane of the cutting bed.

(A8) The method denoted as (A7), wherein the cutting torch is moved past its focal point while cutting horizontally.

(A9) Any of the methods denoted as (A1) through (A8), wherein the step of cutting includes drilling at least two holes in the long product of two different respective sizes.

(A10) Any of the methods denoted as (A1) through (A9), wherein, prior to the step of cutting, support placement information is entered into a program of the numerical control machine.

(A11) Any of the methods denoted as (A1) through (A9), wherein, during the step of cutting, support placement information is automatically determined.

(A12) Any of the methods denoted as (A1) through (A11), wherein the step of cutting comprises two or more subprocesses of marking, sawing, drilling, penetrating, coping, mitering, and cutoff of the long product.

(A13) The method denoted as (A12), wherein the two or more subprocesses are performed on at least two different sides of the long product.

(A14) Any of the methods denoted as (A1) through (A13), wherein the step of cutting includes a substep of penetrating only partially through a thickness a material of the long product.

(A15) Any of the methods denoted as (A1) through (A14), wherein the long product is a pipe, and the pipe is held stationary in three dimensions during the steps of moving and cutting.

(A16) The method denoted as (A15), wherein the step of cutting includes a substep of creating at least one bolt hole in the pipe.

(A17) Any of the methods denoted as (A1) through (A16), further comprising a step of measuring the long product along a length of the long product for variations in the height and width of the long product.

(A18) The method denoted as (A17), wherein the step of measuring is performed by a laser measurement device on the gantry.

(A19) The method denoted as (A17), wherein the step of measuring is performed by ohmic contact with a surface of the long product.

(A20) Any of the methods denoted as (A1) through (A19), wherein the step of cutting includes processing of at least two separate nested materials from the long product.

(A21) Any of the methods denoted as (A1) through (A20), wherein the step of cutting includes at least two different cutting processes performed on different respective sections of the long product.

(A22) Any of the methods denoted as (A1) through (A21), wherein the step of cutting includes a substep of swivelling the cutting torch in a C azimuth while cutting a miter into the long product.

(A23) The method denoted as (A22), further including a substep of adding weld preparation, by the same cutting torch on the same gantry, to the miter cut into the long product.

(B1) A system of processing a long product, including: (1) a machine bed; (2) a gantry holding a cutting torch, the cutting torch for cutting a stationary long product on the machine bed; (3) a numerical control machine including an NC controller for controlling movement of the gantry and cutting torch relative to the machine bed; and (4) means for holding the long product stationary on the machine bed, in a lengthwise direction of the long product and machine bed, while a cutting operation is performed on the long product by the cutting torch, wherein the gantry is moveable along a substantial length of the long product and machine bed in the lengthwise direction.

(B2) The system denoted as (B1), wherein the means for holding the long product comprises a weight of the long product on the machine bed.

(B3) Either of the systems denoted as (B1) or (B2), further including support structures between the long product and the machine bed.

(B4) Any of the systems denoted as (B1) through (B3), wherein a length of the cutting bed is substantially equal to a length of the long product.

(B5) Any of the systems denoted as (B1) through (B4), wherein the cutting torch includes a pantograph bevel head.

(B6) Any of the systems denoted as (B1) through (B5), wherein the cutting torch includes a plasma torch.

(B7) Any of the systems denoted as (B1) through (B6), wherein the cutting torch includes a two-axis torch capable of rotating in an XY plane substantially parallel to a plane of the cutting bed while moving perpendicularly in a Z-direction height relative to the cutting bed.

(B8) Any of the systems denoted as (B1) through (B6), wherein the cutting torch includes a three-axis torch, wherein a torch direction is defined by a rotational azimuth C, a vertical tilt A, and a height Z.

I claim:

1. A method of processing long product defining a lengthwise longitudinal direction on a numerical control machine including a cutting bed and a gantry, the gantry coupled through a drive box and a pantograph to a plasma cutting torch, the method comprising:

moving the gantry to position the plasma cutting torch over a long product on the cutting bed along the lengthwise longitudinal direction while performing a step of cutting the long product with the plasma cutting torch, the cutting including cutting on a first surface and a second surface of the long product, to process the long product, where the long product is selected from a group consisting of I beams, channel, equal angle, unequal angle, rolled hollow section having rectangular cross-section, and T section products, wherein the plasma cutting torch is configured to be able to rotate at least 90 degrees about the lengthwise longitudinal direction between cutting on the first surface and cutting on the second surface and is adapted to move in at least one of the lengthwise longitudinal direction, a lateral direction, an azimuth direction, and a vertical direction relative to a coordinate system defining the dimensions of the long product; and where the long product remains stationary on the cutting bed throughout the plasma cutting torch rotation and cutting on both the first and second surfaces of the long product;

the first and second surfaces of the long product are perpendicular to each other; and where the plasma cutting torch is configurable to be positioned in a pantograph with a tip of the plasma cutting torch at a first point and configurable to be positioned in the pantograph with the tip of the cutting torch at a second point, the first point being where the central lengthwise axis of the plasma cutting torch and a twist axis of the pantograph intersect, and the second point being along the central lengthwise axis of the plasma cutting torch extended beyond the twist axis of the pantograph toward the long product; wherein the step of cutting comprises cutting at least a first hole in the first surface and a second hole in the second surface of the long product, the first surface at right angles to the second surface of the long product; wherein the step of cutting comprises two plasma cutting functions performed by the plasma cutting torch, the plasma cutting functions selected from a group consisting of cutoff of the long product, cutting holes in the long product, penetrating the long product, coping the long product, mitering the long product, text marking on the long product, and line marking on the long product, and wherein the two plasma cutting functions are performed on at least the first and second surfaces of the long product and each of the two functions is performed with the plasma cutting torch at right angles to the surface.

2. The method of claim 1, wherein the long product is held stationary during the step of moving solely by a weight of the long product.

3. The method of claim 1, wherein the long product is held stationary during the step of moving by clamps or fixed holding structures.

4. The method of claim 1, wherein the step of cutting comprises at least three multi-pass cutting substeps, wherein at least one of the multi-pass cutting sub steps comprises further processing of the long product to include weld preparation along a cut of the long product provided by a prior one of the at least one of the multi-pass cutting substeps.

5. The method of claim 1, wherein, during the step of moving, the gantry moves along a lengthwise direction of the long product relative to the cutting bed, while the long product remains stationary in the lengthwise direction relative to the cutting bed.

6. The method of claim 1, wherein the plasma cutting torch is held perpendicular to the first surface of the long product during cutting the first surface and perpendicular to the second surface during cutting the second surface, the surfaces including a horizontal surface and a vertical surface of the long product.

7. The method of claim 1, wherein the step of cutting includes cutting the long product in a horizontal plane parallel to a plane of the cutting bed and with the plasma cutting torch perpendicular to the horizontal plane.

8. The method of claim 1, wherein the step of cutting comprises cutting a third hole in a third surface, the first surface at right angles to the second surface of the long product and the third surface at right angles to the second surface and parallel to the first surface.

9. The method of claim 1, wherein, prior to the step of cutting, information concerning support placement is automatically determined and entered into a program of the numerical control machine.

10. The method of claim 1, wherein the step of cutting comprises a substep of penetrating only partially through a thickness of a material of the long product to form marks that survive painting and simulate heavy stamping.

11. The method of claim 1, further comprising a step of measuring the long product along a length of the long product for variations in a height, a width, and a surface angle of the long product to create a precise model of the multiple surfaces such that the plasma cutting torch is held at a precise angle to the surface and a precise distance from the surface.

12. The method of claim 11, wherein the step of measuring is performed by a laser measurement device on the gantry.

13. The method of claim 11, wherein the step of measuring is performed by ohmic contact with a surface of the long product.

14. The method of claim 1, wherein the step of cutting includes processing of at least two separate nested components from the long product.

15. The method of claim 1, wherein the step of cutting includes at least two different cutting or marking processes performed on different respective sections of the long product.

16. The method of claim 1, wherein the step of cutting includes a substep of swiveling the plasma cutting torch in a C azimuth while cutting a miter into the long product.

17. The method of claim 16, further comprising a substep of adding weld preparation, by the plasma cutting torch on the gantry, to the miter cut into the long product.

* * * * *